US012683351B2

(12) United States Patent
Bongs et al.

(10) Patent No.: US 12,683,351 B2
(45) Date of Patent: Jul. 14, 2026

(54) LASER SYSTEM

(71) Applicant: The University of Birmingham, Birmingham (GB)

(72) Inventors: Kai Bongs, Birmingham (GB); Mehdi Langlois, Birmingham (GB); Luuk Earl, Birmingham (GB); Michael Holynski, Birmingham (GB)

(73) Assignee: The University of Birmingham, Birmingham (GB)

( * ) Notice: Subject to any disclaimer, the term of this patent is extended or adjusted under 35 U.S.C. 154(b) by 380 days.

(21) Appl. No.: 18/264,956

(22) PCT Filed: Feb. 11, 2022

(86) PCT No.: PCT/GB2022/050383
§ 371 (c)(1),
(2) Date: Aug. 10, 2023

(87) PCT Pub. No.: WO2022/172030
PCT Pub. Date: Aug. 18, 2022

(65) Prior Publication Data
US 2024/0136785 A1 Apr. 25, 2024
US 2024/0235146 A9 Jul. 11, 2024

(30) Foreign Application Priority Data

Feb. 15, 2021 (GB) ...................................... 2102114

(51) Int. Cl.
*H01S 3/107* (2006.01)
*G01V 7/04* (2006.01)
(Continued)

(52) U.S. Cl.
CPC ................ *H01S 3/107* (2013.01); *G01V 7/04* (2013.01); *G02F 1/0121* (2013.01); *G02F 1/225* (2013.01);
(Continued)

(58) Field of Classification Search
CPC .... G02F 1/0121; G02F 1/225; H01S 3/06754; H01S 3/107; H01S 3/109; H01S 2302/00; G01V 7/00; G01V 7/04
See application file for complete search history.

(56) References Cited

U.S. PATENT DOCUMENTS 9,823,540 B2 * 11/2017 Gottwald .............. G02F 1/2255
12,308,596 B2 * 5/2025 Hardman .............. G02F 1/3515
(Continued)

FOREIGN PATENT DOCUMENTS

CN        106253992        11/2018
CN        111106872 A       5/2020
(Continued)

OTHER PUBLICATIONS

Dong Po et al, "In-Phase/Quadrature Modulation by Directly Reflectivity Modulated Laser", 2020 Optical Fiber Communications Conference and Exhibition (OFC), OSA, (Mar. 8, 2020), doi:10.1364/OFC.2020.M2B.2, pp. 1-3, XP033767390.
(Continued)

*Primary Examiner* — Daniel Petkovsek
(74) *Attorney, Agent, or Firm* — Blueshift IP, LLC; Robert Plotkin

(57) ABSTRACT

A single arm laser system comprising a first in-phase quadrature modulator, IQM. The first IQM is configured to receive a single frequency fibred laser beam from a frequency locked laser seed, generate a first single side-band frequency based on a carrier frequency of the single frequency fibred laser beam and suppress the carrier frequency, and output a first fibre laser beam having a single side-band suppressed carrier frequency. The single arm laser system also comprises a second IQM in line with the first IQM. The second IQM is configured to receive the first fibre laser beam from the first IQM, generate a second single side-band frequency based on the first single side-band frequency and
(Continued)

maintain the first single side-band frequency as the carrier frequency, and output a second fibre laser beam having the first and second single side band frequencies.

13 Claims, 6 Drawing Sheets

(51) Int. Cl.

| | |
|---|---|
| *G02F 1/01* | (2006.01) |
| *G02F 1/225* | (2006.01) |
| *G02F 1/37* | (2006.01) |
| *H01S 3/067* | (2006.01) |
| *H01S 3/109* | (2006.01) |
| *G01V 7/00* | (2006.01) |

(52) U.S. Cl.

CPC ............ *G02F 1/37* (2013.01); *H01S 3/06754* (2013.01); *H01S 3/109* (2013.01); *G01V 7/00* (2013.01); *H01S 2302/00* (2013.01)

(56) References Cited

U.S. PATENT DOCUMENTS

| | | | |
|---|---|---|---|
| 2004/0141222 A1* | 7/2004 | Miyazaki ............... | G02F 1/0121 |
| | | | 359/237 |
| 2013/0101295 A1 | 4/2013 | Dupuis | |
| 2020/0021078 A1 | 1/2020 | Brooker | |
| 2020/0395726 A1 | 12/2020 | Lien | |

FOREIGN PATENT DOCUMENTS

| | | | | |
|---|---|---|---|---|
| EP | 3160062 | | 4/2017 | |
| FR | 3074371 A1 | | 5/2019 | |
| JP | 2004170954 A | * | 6/2004 | ............... G02F 1/01 |
| WO | 2019005824 | | 1/2019 | |
| WO | 2021000008 | | 1/2021 | |

OTHER PUBLICATIONS

International Search Report and Written Opinion issued in App. No. PCT/GB2022/050383, dated Apr. 29, 2022, 10 pages.
Search Report issued in App. No. GB2102114, dated Jul. 27, 2021, 5 pages.
European Examination Report issued in App. No. EP22706094 dated Aug. 20, 2025 (pp. 1-7).

\* cited by examiner

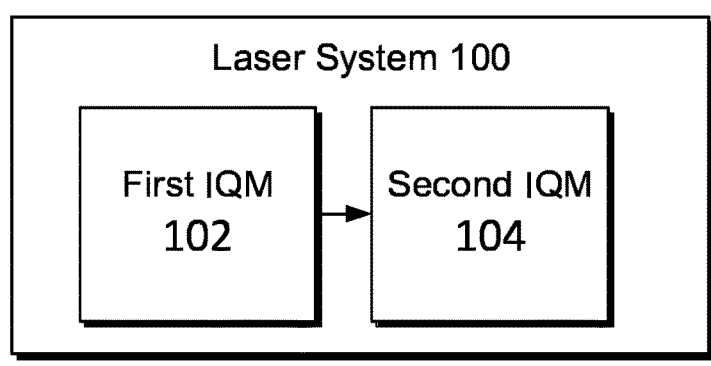

Laser System 100

First IQM
102

Second IQM
104

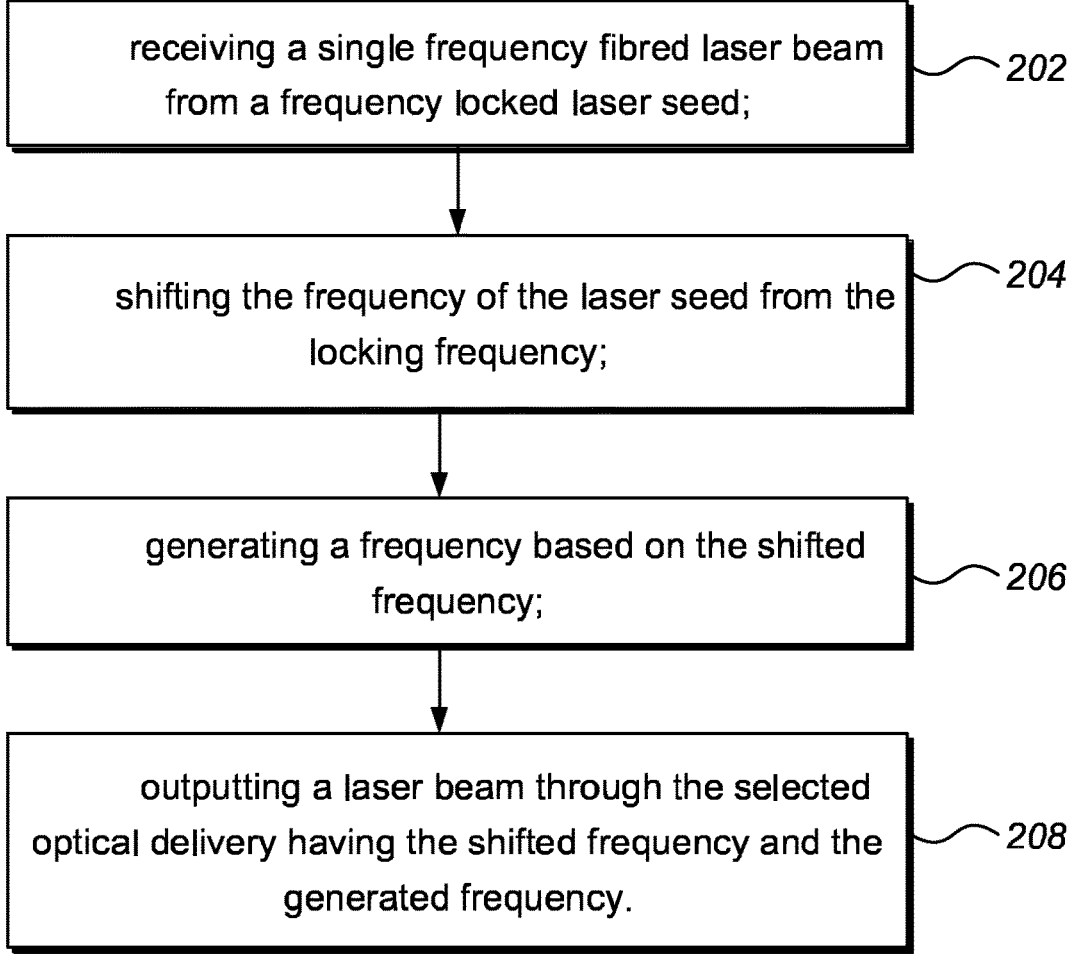

receiving a single frequency fibred laser beam from a frequency locked laser seed;  ~202 shifting the frequency of the laser seed from the locking frequency;  ~204 generating a frequency based on the shifted frequency;  ~206 outputting a laser beam through the selected optical delivery having the shifted frequency and the generated frequency.  ~208

LASER SYSTEM

This present application provides disclosures relating to laser systems, in particular single arm laser systems that can generate multiple frequencies in a single laser beam.

BACKGROUND

Precision measurements performed using two laser beams relies on these laser beams having both a stable phase-relation and a controlled frequency difference.

Laser systems have been developed to produce laser beams for precision measurement and either comprise two lasers that are phase stabilized with respect to each other or a single laser with a phase modulation to generate multiple frequency components. Systems that use a single laser only require a single seed-laser, thus reducing complexity and potentially enabling more compact designs.

Most laser systems that are based on phase modulation using a single laser apply an electro-optic modulator (EOM). An EOM uses an electrical control signal to modulate the electro-optic effect, the electro-optic effect being the modification of the refractive index of a material by an electric field. For a laser system, the EOM may be configured to receive a laser beam and create sidebands by applying a sinusoidally varying potential voltage as the electrical control signal.

It is in the above context that the present disclosure has been devised.

BRIEF SUMMARY OF THE DISCLOSURE

In addition to generating the desired frequencies, an EOM also generates undesired frequency components. Moreover, use of an EOM is inefficient as it wastes the available optical power and could drive parasitic transitions that perturb measurements.

As an alternative, a new method that suppresses undesirable frequency components is based on an in-phase quadrature modulator (IQM) that generates an optical single-sideband (OSSB) for tunable laser frequency components with a single seed-laser. Using an IQM instead of an EOM, enables better control of the frequency components by allowing another frequency to be generated whilst either keeping or suppressing the carrier, and, optionally, the other sidebands. Moreover, the IQM allows a large frequency flexibility of up to 25 GHz. However, the IQM is limited in its output as it can only generate one frequency. By utilising two IQMs, two frequencies can be generated whilst still maintaining control over the frequency components by selectively suppressing the carrier and sidebands. This is advantageous for a multitude of applications requiring more than one frequency. For example, atom interferometry requires several steps including cooling, interrogation and detection. The manipulation of rubidium atoms requires two frequencies at each step. With a laser seed locked at a given frequency, a single IQM can generate another frequency while keeping or suppressing the carrier frequency from the locked seed, but it can't generate the second frequency needed at each step. Having two IQMs allows the generation of two frequencies at each step shifted from the locked seed.

Viewed from one aspect, the present disclosure provides a single arm laser system comprising a first in-phase quadrature modulator (IQM), the first IQM configured to receive a single frequency fibred laser beam from a frequency locked laser seed, generate a first single side-band frequency based on a carrier frequency of the single frequency fibred laser beam and suppress the carrier frequency, and output a first fibre laser beam having a single side-band suppressed carrier frequency. The single arm laser system also comprises a second IQM in line with the first IQM, the second IQM configured to receive the first fibre laser beam from the first IQM, generate a second single side-band frequency based on the first single side-band frequency and maintain the first single side-band frequency as the carrier frequency, and output a second fibre laser beam having the first and second single side band frequencies.

In consideration of the context of the above background, the inventors have come to the surprising realisation that the limitations of the IQM can be overcome by utilising two IQMs in the above configuration in a laser system. The use of two IQMs a laser system in the above way allows a large flexibility and agility in the frequencies delivered, which enables the laser system to be easily used in an application where a range of multiple frequencies are needed, for example, in a gravity gradiometer. In detail, a large range of frequencies can be produced by such a laser system and also more than one frequency can be produced simultaneously by the laser system. In fact, the laser system can produce a plurality of frequencies at the same time to enable the system to independently provide all necessary laser frequencies for an application, such as in gravity gradiometers for laser cooling, interrogation of atoms and the detection of atomic states. The laser system can provide one laser beam and switch between the multiple frequencies available in the laser beam due to the laser system based on the application. For example, the laser system above may be controlled to arbitrarily produce all necessary frequencies for use in a quantum gravity gradiometer based on atom interferometry. That is, the laser system may be operated to produce from a single source laser the cooling frequency, interrogation frequency and detection frequency in an agile manner. The laser system being able to provide a laser beam having the correct frequency for multiple functions makes it extremely useful where multiple frequencies are required in a particular system. This can be achieved using a single laser source, two IQMs in the above arrangement, and control electronics.

Thus, the present invention realises a compact and robust laser system that comprises two IQMs forming a stable, precise and accurate frequency generator capable of providing multiple frequencies, for example, for use in high-precision atom-interferometry experiments. The frequency generation is tunable, phase-stable and efficient and the laser beam generated has low phase noise. This enables improved measurement precision and accuracy of results from atom-interferometry experiments, as well as other experiments and applications. Moreover, the size of the laser system enables the system to be utilised in a wider range of applications, and simplifies the apparatus needed for deployment of such systems in the field, away from a laboratory.

Moreover, the laser system being a single arm laser system rather than having two or more arms is advantageous. A laser system may have two arms where the output of the first IQM is split into a first and a second arm and the second IQM is in one of the two arms. Firstly, having a single arm reduces the size of the laser system, increasing the utility of the laser system and making the laser system more portable, in addition to optimising the power of the laser system. Secondly, a laser system having two or more arms requires a mixer after in order to combine the arms, which introduces losses into the signal. Therefore the laser system being a single arm laser system is advantageous because there is no loss and no extra power consumption due to mixing.

It would not be obvious to a skilled person how to modify a laser system having two or more arms into a single arm laser system because, this would normally result in only one frequency being output from the laser system. The present invention solves this complex problem by providing a second IQM in combination with the first IQM, the second IQM configured to receive the first fibre laser beam from the first IQM, generate a second single side-band frequency based on the first single side-band frequency and maintain the first single side-band frequency as the carrier frequency, and output a second fibre laser beam having the first and second single side band frequencies. Thus, by maintaining the first single side-band, multiple frequencies can be output from the laser system. By outputting multiple frequencies from the second IQM, two arms are not required, the advantages of which have been described above. Moreover, this means the second IQM can be connected directly to the Erbium doped fibre amplifier (EDFA) as described in more detail in relation to FIG. 4.

By generating a second single side-band frequency based on the first single side-band frequency and maintaining the first single side-band frequency as the carrier frequency, the laser system can adjust the first IQM to select a frequency for the first single side band and adjust the second IQM to select a frequency for the second single side band. Therefore, the laser system is able to provide a laser beam having the correct frequency for multiple functions. This differs to an IQM generating two single side bands, the frequencies of which are then linked such that the frequencies of the single side bands cannot be separately selected.

The first IQM may receive two radio-frequency (RF) signals of the same frequency in phase quadrature, the generation of the first single side-band frequency being driven by the frequency of the two RF signals input into the first IQM, and the second IQM may also receive two RF signals of the same frequency in phase quadrature, the generation of the second single side-band frequency being driven by the frequency of the two RF signals input into the second IQM.

The single arm laser system may further comprise a microwave chain to generate the two RF signals in phase quadrature received by the first IQM, and the two RF signals in phase quadrature received by the second IQM.

The RF signals generated by the microwave chain may be used to drive a microwave antenna which is used for the hyperfine level selection.

The RF signals generated by the microwave chain may be used to drive an electro-optic modulator (EOM) which is used to modulate the laser for the spectroscopy locking.

The microwave chain may comprise an oven controlled crystal oscillator, OCXO, as its single frequency reference.

The single frequency fibred laser beam may have a wavelength of about 1560 nm.

The single arm laser system may further comprise an Erbium doped fibre amplifier, EDFA, to amplify the power of the second fibre laser beam.

The single arm laser system may further comprise an acousto-optic modulator, AOM, to switch the second fibre laser beam on and off and to control its power.

The single arm laser system may further comprise a second harmonic generator, SHG, configured to double the frequencies, so halve the wavelength of the second fibre laser beam from about 1560 nm to about 780 nm.

The single arm laser system may further comprise an optical fibre switch to select the optical delivery of the second fibre laser beam.

Viewed from another aspect, the present disclosure provides a method for generating multiple frequencies from a frequency locked laser seed, the method to be performed by at least two in-phase quadrature modulators, IQMs. The method comprises receiving a single frequency fibred laser beam from a frequency locked laser seed; shifting the frequency of the laser seed from the locking frequency; generating a frequency based on the shifted frequency; and outputting a laser beam through the selected optical delivery having the shifted frequency and the generated frequency.

The method may further comprise amplifying the laser power; controlling the laser power; and doubling the laser frequencies.

Viewed from another aspect, the present disclosure provides a gravity gradiometer comprising the single arm laser system described above configured to generate a plurality of optical frequencies; and an optical system comprising an arrangement of lenses and optics. The optical system is configured to, using the optical frequencies generated by the single arm laser system, trap and cool atoms to form two vertically separated cold atom clouds, select the hyperfine level of the atoms of the cold atom clouds, trap atoms of each cold atom cloud in an optical lattice, perform Raman interrogation of the two cold atom clouds simultaneously with the same laser beam, and detect the atomic states of each cloud by fluorescence to find the gravity gradient.

Utilising the laser system in a gravity gradiometer enables the realisation of gradiometric survey with a compact and robust system, made of a single source of atoms and a single-arm laser bench. This enables the reduction in size of cold atoms gravity gradiometers, making them easier to transport.

It will be appreciated from the foregoing disclosure and the following detailed description of the examples that certain features and implementations described as being optional in relation to any given aspect of the disclosure set out above should be understood by the reader as being disclosed also in combination with the other aspects of the present disclosure, where applicable. Similarly, it will be appreciated that any attendant advantages described in relation to any given aspect of the disclosure set out above should be understood by the reader as being disclosed as advantages of the other aspects of the present disclosure, where applicable. That is, the description of optional features and advantages in relation to a specific aspect of the disclosure above is not limiting, and it should be understood that the disclosures of these optional features and advantages are intended to relate to all aspects of the disclosure in combination, where such combination is applicable.

BRIEF DESCRIPTION OF THE DRAWINGS

Embodiments of the invention are further described hereinafter with reference to the accompanying drawings, in which:

FIG. 1 provides a laser system according to an example.

FIG. 2 provides an example flowchart of a method to be performed by a laser system according to an example.

DETAILED DESCRIPTION

Figure 3A:
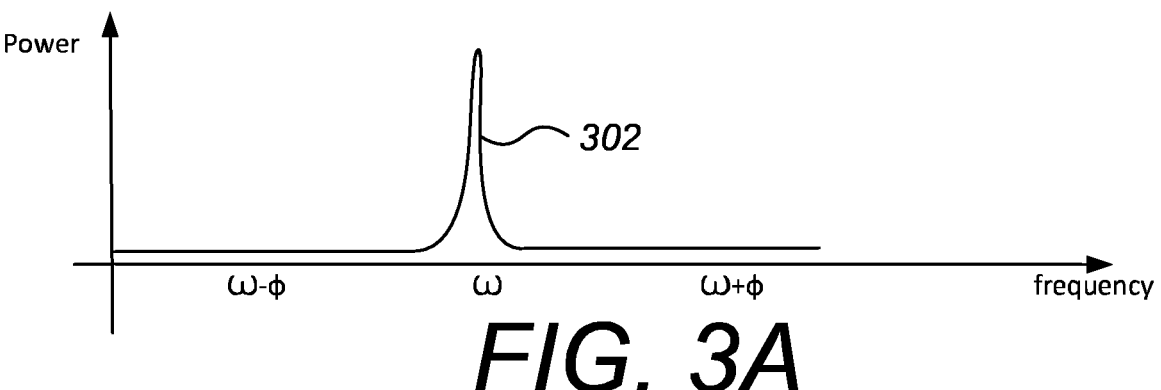
FIGS. 3A to 3C provide an illustration of the frequencies of the laser beam during the method of FIG. 2.

The present disclosure describes a single arm laser system comprising a first in-phase quadrature modulator, IQM, the first IQM configured to receive a single frequency fibred laser beam from a frequency locked laser seed, generate a first single side-band frequency based on a carrier frequency of the single frequency fibred laser beam while suppressing the carrier frequency, and output a first fibre laser beam having a single side-band suppressed carrier frequency. The single arm laser system also comprises a second IQM in line with the first IQM, the second IQM configured to receive the first fibre laser beam from the first IQM, generate a second single side-band frequency based on the first single side-band frequency and maintain the first single side-band frequency as the carrier frequency, and output a second fibre laser beam having the first and second single side band frequencies.

FIG. 1 provides a laser system 100 according to an example. The laser system 100 comprises a first in-phase quadrature modulator (IQM) 102 and a second IQM 104 in line with the first IQM 102. The first IQM 102 is configured to receive 202 a single frequency fibred laser beam from a frequency locked laser seed, generate a first single side-band frequency based on a carrier frequency of the single frequency fibred laser beam while suppressing the carrier frequency, and output a first fibre laser beam having a single side-band suppressed carrier frequency. The second IQM is configured to receive the first fibre laser beam from the first IQM, generate 206 a second single side-band frequency based on the first single side-band frequency and maintain the first single side-band frequency as the carrier frequency, and output 208 a second fibre laser beam having the first and second single side band frequencies. The laser system may be a single-arm fibre laser bench. The second IQM may directly follow the first IQM. In some examples The first IQM 102 may be configured to generate a first single side-band frequency based on a carrier frequency of the single frequency fibred laser beam while suppressing the carrier frequency.

FIG. 2 provides an example flowchart of a method 200 to be performed by a laser system according to an example. The method 200 is for generating multiple frequencies from a frequency locked laser seed. The method 200 may be performed by laser system 100 of FIG. 1, in particular, by the two IQMs 102, 104 of the laser system 100. Referring to FIGS. 1 and 2, the method 200 comprises receiving 202 a single frequency fibred laser beam from a frequency locked laser seed, shifting 204 the frequency of the laser seed from the locking frequency, generating 206 a frequency based on the shifted frequency and outputting 208 a laser beam through the selected optical delivery having the shifted frequency and the generated frequency.

Figure 3B:
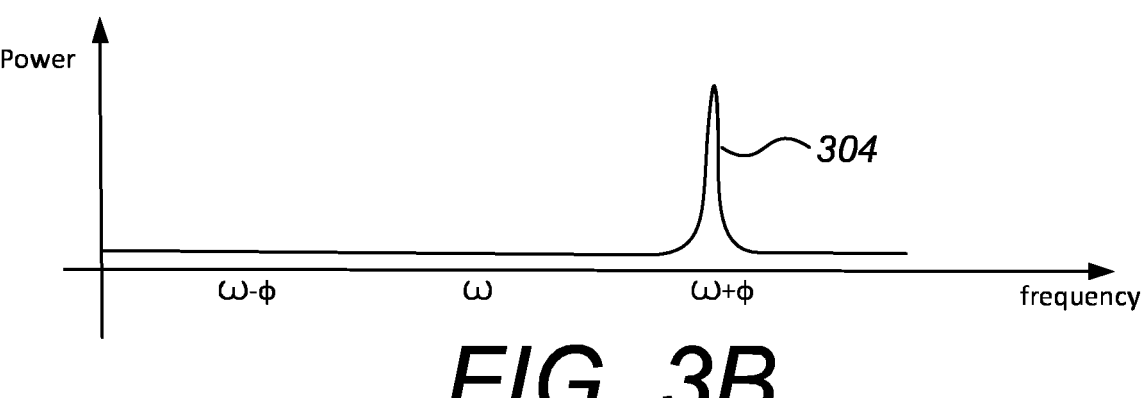
Figure 3C:
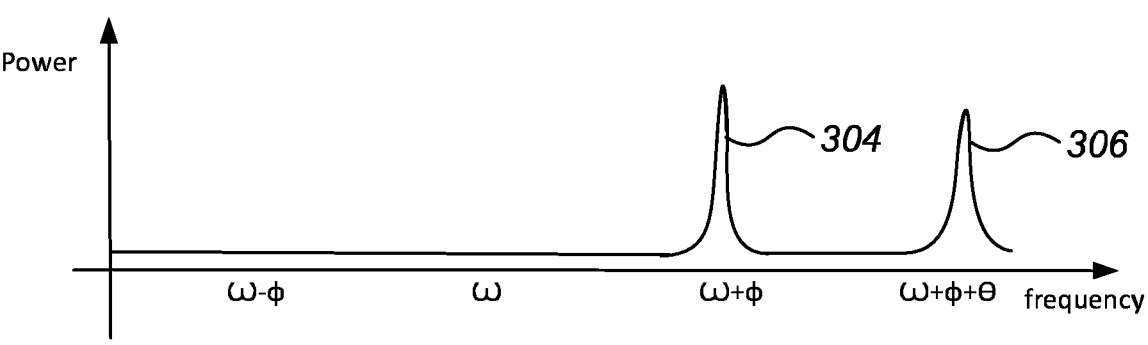

FIGS. 3A to 3C provide an illustration of the frequencies of the laser beam during the method of FIG. 2. FIG. 3A provides a graph of the frequency distribution of the single frequency fibred laser beam. FIG. 3B provides a graph of the frequency distribution of the first fibre laser beam. FIG. 3C provides a graph of the frequency distribution of the second fibre laser beam. The laser system 100 will now be described in detail with reference to FIGS. 1, 2 and 3A to 3C.

The first and second IQMs are operable to modulate light from the laser source at a carrier frequency to produce modulated light having a single sideband at a sideband frequency. The single sideband produced by each IQM may be at a modulation frequency with respect to the carrier frequency. The single sidebands produced by the IQMs may be at a modulation frequency higher or lower with respect to the carrier frequency. The first IQM additionally suppresses the carrier frequency. Using two IQMs provides the capability of rapidly changing the sideband frequency over a large frequency range.

An IQM receives a signal and modulates the signal by modulating its in-phase (I) and quadrature (Q) components, these components having a phase difference of $\pi/2$ radians (a quarter of a cycle). The modulation of the I and Q components then causes the modulation of the signal when the components are summed together. An IQM is typically used in telecommunications, for example, in a Quadrature Phase Shift Keying (QPSK) modulation scheme where the combination of inverted and non-inverted I and Q components provides four IQ states with the signal having phase shifts of 45°, 135°, 225°, and 315°. IQMs have been developed to be robust and compact due to their use in telecommunication and therefore using IQMs enables the laser system to be more robust and compact.

An optical IQM may be implemented using Mach-Zehnder modulators. An example IQM is the MXIQER-LN-30 from iXblue™. In an example, an IQM may be a dual parallel Mach Zehnder modulator (DP-MZM). The DP-MZM may comprise two parallel straight waveguides as optical arms. There may be a phase difference between the signal in the optical arms. In an example, the signal may be phase shifted by $\pi/2$ radians in one of the arms resulting in one arm having an in-phase (I) component and the other arm having a quadrature (Q) component of the signal. The phase difference may be controlled by a DC voltage signal which may be used as a bias point. Each arm may contain two phase modulators in a Mach-Zehnder configuration. Thus, the IQM may be effectively two parallel Mach Zehnder interferometers nested inside a third Mach Zehnder Interferometer. In an example, both nested Mach Zehnder interferometers may receive the same DC voltage signal. The phase modulators in this configuration amplitude modulate the I and Q components of each of the nested interferometers independently, enabling any kind of multi-level modulation format. The phase modulators may be driven in a push-pull mode of operation. When the I and Q components are recombined, the sum of these components provides an IQ modulated signal. The IQ modulated signal may have a different amplitude, a different phase or a different frequency to the input signal.

In an example, the phase modulators comprise material that induces a refractive index change based on the applied voltage. Thus, the amount of electrical power received at the phase modulators changes the refractive index of the modulators and therefore modulates the phase of the beam input into the modulators. In an example, the phase modulators may be configured to change the phase of an incident beam based on a control frequency applied to the modulator. In an example, the applied voltage may be varied sinusoidally with a given frequency and amplitude, that will generate side bands separated from the carrier by an integer multiple of the applied frequency with an amplitude related to the applied amplitude. In an example, the phase modulators of the first of the nested Mach Zehnder interferometers receive the same control input and the phase modulators of the second of the nested Mach Zehnder interferometers receive the same control input. In an example, both nested Mach Zehnder interferometers receive RF control signals. The RF control signals may be used to generate the side bands.

In the first IQM 102 of laser system 100, the input signal is the single frequency fibred laser beam, which is received 202 by the first IQM 102. An example of the frequency distribution of the single frequency fibred laser beam is illustrated in the graph of FIG. 3A. In this graph, the single frequency, which is the carrier frequency for the purposes of the first IQM 102, is shown by a frequency peak 302 at ω. After modulation through the I and Q components, the first IQM 102 outputs an IQ modulated version of the single frequency fibred laser beam, referred to as the first fibre laser beam. The first IQM 102 modulates the I and Q components to output a first fibre laser beam with a single frequency, the single frequency being a first single side band frequency. During modulation, the first IQM 102 uses the carrier frequency CD to generate a first single side band frequency ω+φ, as shown by frequency peak 304 in the graph of FIG. 3B. The carrier frequency, which is the locking frequency of the single frequency fibred laser beam is also suppressed simultaneously, as illustrated in the graph of FIG. 3B, which only shows the first single side band frequency peak 304 at ω+φ. The carrier frequency may be suppressed by at least 30 dB. The graph of FIG. 3B shows the outputted first fibre laser beam once the side band frequency has been generated and the carrier frequency suppressed. Thus, the generation of the first single side band frequency and suppression of the carrier frequency shifts 204 the frequency of the laser seed from the locking frequency. The first IQM shifts the frequency peak 302 at ω in the graph of FIG. 3A to the frequency peak 304 at ω+φ in the graph of FIG. 3B. The first single side band may be the first order side band.

The first IQM 102 may be referred to as a carrier suppression single sideband (CS-SSB) IQM. In an example, the first IQM may operate as the Mach-Zehnder modulator described above. The first IQM 102 may be a DP-MZM. In an example the first IQM may operate as the Mach-Zehnder modulator described above but the two Mach-Zehnders may cause a phase shift of π/2 radians to suppress one of the two remaining side-band and the two phase modulators in a Mach-Zehnder configuration may have a phase difference of π radians, to suppress the carrier.

In the second IQM 104 of laser system 100, the input signal is the first fibre laser beam, which is received after having been outputted from the first IQM 102. An example of the frequency distribution of the first fibre laser beam is illustrated in the graph of FIG. 3B, showing the single side band frequency peak 304 at ω+φ. In this graph, the single side band frequency peak 304 at ω+φ is the carrier frequency for the purposes of the second IQM 104. After modulation of the I and Q components, the second IQM 104 outputs an IQ modulated version of the first fibre laser beam, referred to as a second fibre laser beam. The IQM via the modulation of the I and Q components outputs a second fibre laser beam with two frequencies: the first single side band frequency as the carrier frequency and the side band frequency being a second single side band frequency. The second single side band may be the first order side band. During modulation, the second IQM 104 uses the carrier frequency ω+φ, also known as the shifted frequency, to generate 206 a second single side band frequency ω+φ+θ, as shown by frequency peak 306 in the graph of FIG. 3C. In the second IQM 104, by modifying the phase shift inside the DP-MZM, the carrier frequency is not suppressed, and so the graph of FIG. 3C which shows the outputted second fibre laser beam shows two frequency peaks, a first single side-band frequency peak 304 at ω+φ and a second single side band frequency peak 306 at ω+φ+θ. The second IQM 104 then outputs 208 the second fibre laser beam having the first single side band frequency and the second single side band frequency. The first single side band frequency is also known as the carrier frequency of the second IQM and as the shifted frequency and the second single side band frequency is also known as the side band frequency of the second IQM and as the generated frequency.

The second IQM 104 may be referred to as a single side band (SSB) IQM or an optical single side band (OSSB) IQM. In an example, the second IQM 104 may operate as the Mach-Zehnder modulator described above. The second IQM 104 may be a DP-MZM. In an example the second IQM 104 may operate as the Mach-Zehnder modulator described above but the two Mach-Zehnders may cause a phase shift of π/2 radians and the two phase modulators in a Mach-Zehnder configuration may have a phase difference of only π/2 radians to keep the carrier. In an example, the two frequencies ω+φ and ω+φ+θ of the second fibre laser beam may be used during a plurality of different applications, for example, during interferometry. The second IQM 104 may be the same as the first IQM 102, and the differences between their outputs may arise from the phase modulators being controlled differently such that the phase shift of the I and Q components in each IQM is different.

The laser seed may be locked by spectroscopy to fix its frequency. The frequency locked laser seed may be a seed having a wavelength of 1560 nm. This enables IQMs utilised in telecommunications to be used in the laser system, allowing readily available IQMs to be used. This also allows an Erbium Doped Fibre Amplifier (EDFA) to be used in conjunction with the laser system, as these amplifiers work in a frequency band that includes the wavelength of 1560 nm.

Figure 4:
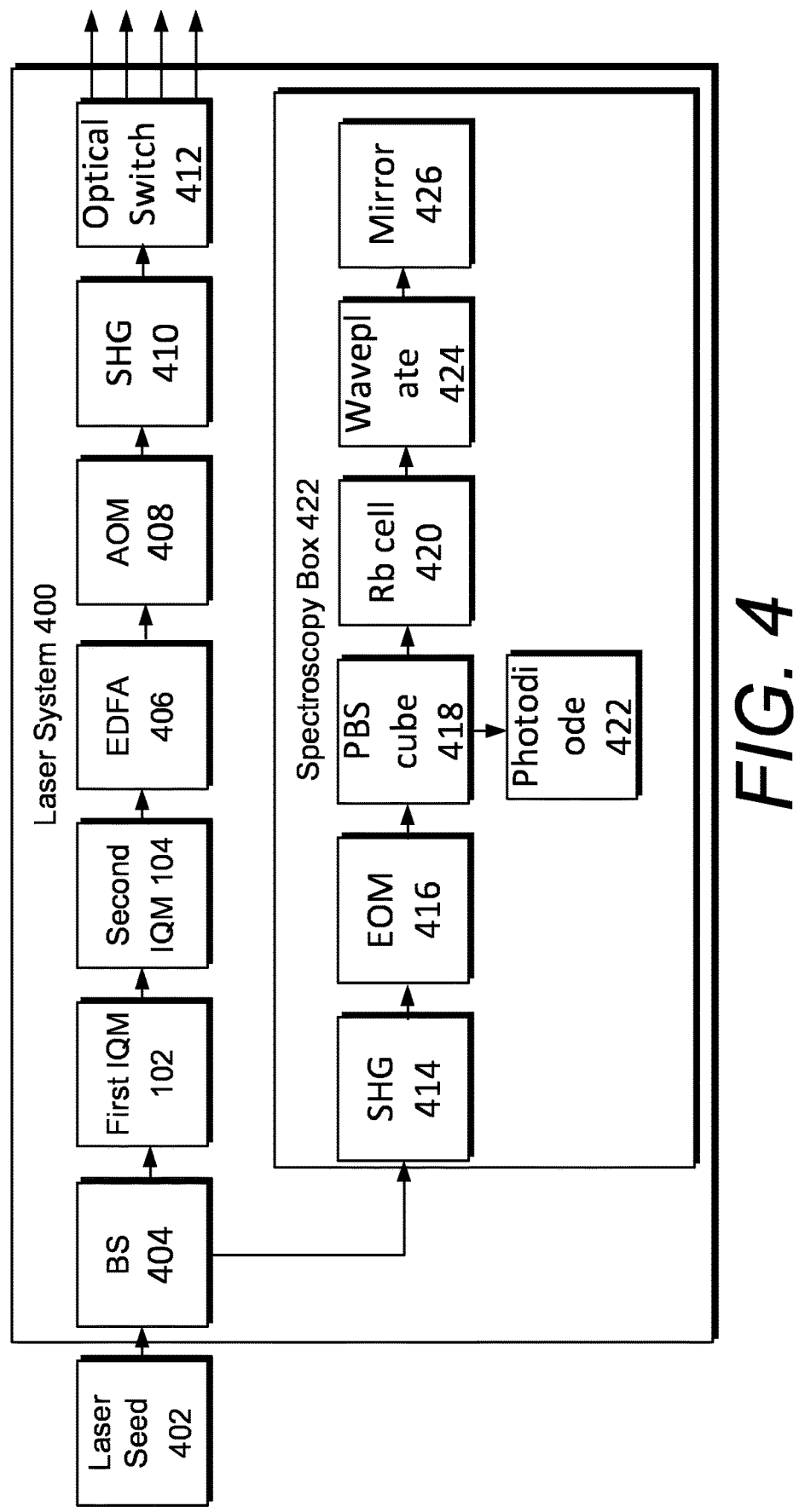
FIG. 4 provides another laser system according to an example.

FIG. 4 provides another laser system 400 according to an example. The laser system 400 comprises a beam splitter 404. The laser system 400 of FIG. 4 comprises the first IQM 102 and second IQM 104 of the laser system 100 of FIG. 1. The laser system 400 also comprises an EDFA 406, an acousto-optical modulator (AOM) 408, two second harmonic generators (SHG) 410 and 414, an optical switch 412, an electro-optic modulator (EOM) 416, a polarising beam splitter (PBS) cube 418 and a Rubidium (Rb) cell 420. One of the second harmonic generators (SHG) 414, the electro-optic modulator (EOM) 416, polarising beam splitter (PBS) cube 418 and Rubidium (Rb) cell 420 are in a spectroscopy box 422 and may therefore be separated from the rest of the laser system 400. The spectroscopy box 422 may also comprise a photodiode 422 between the PBS cube 418 and Rb cell 420, at 90° of the PBS cube, and a λ/4 waveplate 424 and mirror 426 after the Rb cell 420. Although the laser system 400 of FIG. 4 comprises all of these components, any one or more of these components may be used independently of the others. For example, laser system 100 of FIG. 1 may instead comprise one or more of the components mentioned above for implementation in a variety of applications. For example, laser system 100 of FIG. 1 may further comprise an EDFA to amplify the power of the second fibre laser beam, an AOM to switch the second fibre laser beam on and off and to control its power and/or a SHG to double the frequencies of the second fibre laser beam and reach the wanted frequency to interact with Rubidium atoms. Thus, the method 200 of FIG. 2 may further comprise amplifying the laser power, controlling the laser power; and doubling the laser frequencies.

The laser system receives a laser beam from a laser seed 402. In an example, the laser system may comprise the laser seed 402. The laser seed 402 may be a single frequency fibred laser beam having a wavelength at 1560 nm. The laser seed may be a distributed feedback (DFB) fibre laser. The laser beam received from the laser seed 402 may be split into two using the BS 404 to provide a first and a second split beam. The first split beam enters the spectroscopy box 422 and is used to lock the laser frequency by Saturated Absorption Spectroscopy (SAS). This locked frequency may be locked on the Rb cell 420 by modulation transfer spectroscopy. This locked frequency may be used, for example, to initiate transition between hyperfine energy levels in an atom. The spectroscopy box 422 may utilise a SHG 414 to reach 780 nm and an EOM 416 to modulate the signal. The incident laser beam may be linearly polarised, to be transmitted by the PBS cube 418. The absorption may be read on the photodiode 422 at 90° of the PBS cube 418. The beam may pass through a spectroscopy cell 420 filled with rubidium gas. After passing the $\lambda/4$ waveplate 424 twice, before and after the reflection on the mirror 426, the beam polarisation may be rotated by 90°, and reflected on the way back by the PBS cube 418 to be incident on the photodiode 422. The laser frequency may be locked on the crossover transition of the biggest signal, the $|F=3>\rightarrow|F'=2/3>$ of the rubidium 85.

The second split beam is input into the first IQM. Thus, the second split beam may be the single frequency fibred laser beam as described above in relation to FIGS. 1, 2 and 3A to 3C. The first IQM 102 and second IQM 104 perform the method described above in relation to FIGS. 1, 2 and 3A to 3C to shift and add frequencies and output a second fibre laser beam having first and second single side band frequencies. The second fibre laser beam is then input, optionally directly from the second IQM 104, into an EDFA 406 to amplify the power of the second fibre laser beam. This may amplify the laser beam power by 2 W. The amplified laser beam is then input into an AOM 408 to turn it on and off, for example to create a pulse sequence, which is used, for example, to create pulse sequences for a Raman beam during interferometry. In an example, the AOM may control the optical power of the amplified laser beam to have an on/off frequency of approximately 80 MHz and approximately a 35 ns rise time. The beam is then frequency doubled by a SHG 410 (which halves the wavelength of the light). For example, the frequency may be doubled, so the wavelength may be halved from 1560 nm to 780 nm. In an example, the SHG doubles the first single sideband frequency generated by the first IQM but the second single side band frequency is added to the first side band frequency, so their frequency difference remains the same. The SHG has a high conversion efficiency and so the laser system also has a high efficiency. The SHG may use a periodically poled lithium niobate (PPLN) waveguide crystal. Finally, the beam is then switched between paths for use in one of multiple functions by an optical switch 412, which may be an optical fibre switch. The optical switch 412 selects the optical delivery of the second fibre laser beam. For example, the beam may be switched between two paths. As explained in detail in relation to FIGS. 5 to 8, the optical switch may switch the beam between use in a detection, producing an optical lattice and interrogation when used in a gravity gradiometer.

In an example, when the laser system 400 is utilised, due to the frequency being doubled by the SHG 410, the frequency output by the first IQM may be twice the frequency required by the application. To achieve this, the first IQM may be driven with half the frequency that is required to shift the laser from its locking frequency whilst the second IQM may be driven with the same frequency that is required to be added to the frequency of the first IQM.

The IQMs may be controlled with a microwave chain based on oven controlled crystal oscillator (OCXO) and Direct Digital Synthesis (DDS), and an Dielectric Resonator Oscillators (DRO) for large frequency shift. The microwave chain generates the different frequencies to provide to the IQMs. The frequencies may be provided to the phase modulators of the IQMs to control the change in frequencies of the laser beams. In an example, the IQMs comprise phase modulators that are configured to change the frequencies of an incident beam based on a control frequency applied to the modulator. The different signals provided to the IQMs by the microwave chain are applied to the phase modulators to change the phase and frequency of the beams. Thus, each of the different frequencies provided to the IQMs causes a different frequency output by the IQM. The frequencies output by the IQM are based on those required for use in the application. Thus, the frequencies output by the microwave chain depend on the necessary frequencies for the application of the laser system. Thus, the frequencies generated by the microwave chain should be well controlled and clean as the laser phase is printed on the atoms. To change the frequencies provided to the IQMs by the microwave chain, in order to change the frequencies of the second fibre laser beam output by the second IQM, it would be advantageous for the microwave chain to efficiently switch between frequencies. The microwave chain may therefore use fast electromechanical relay latching switches to provide such an advantage. This enables the laser system to be flexible and efficient in the frequencies it can provide.

Figure 5:
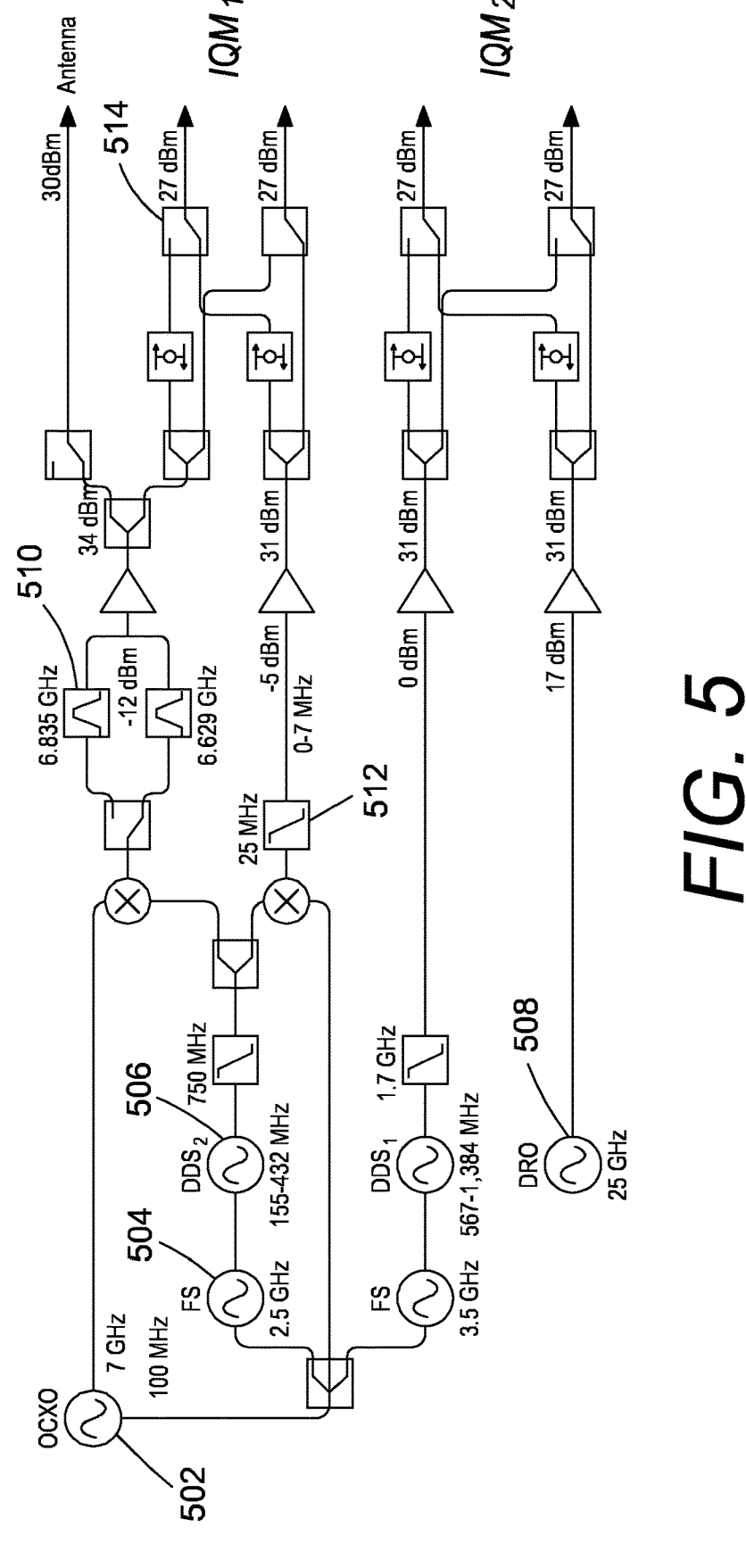
FIG. 5 provides an example microwave chain for use with a laser system according to an example.

FIG. 5 provides an example microwave chain for use with a laser system according to an example. Each of the IQMs may require the receipt of two RF signals of the same frequency in phase quadrature, one for each of the I and Q components. The generation of the first single side-band frequency may be driven by the frequency of the two RF signals input into the first IQM, and the generation of the second single side-band frequency may be driven by the frequency of the two RF signals input into the second IQM. The microwave chain provides two RF signals of one frequency to the first IQM and two RF signals of a different frequency to the second IQM, as illustrated in FIG. 5, the different frequencies being generated by the microwave chain. RF signals generated by the microwave chain may also be used to drive the AOM 408, the microwave antenna and/or the EOM 416 of the spectroscopy.

The microwave chain may generate all the frequencies that need to be provided to laser system 100 of FIG. 1 or laser system 400 of FIG. 4 in order to modulate the laser to provide the correct output. In particular, the microwave chain provides the frequencies to the phase modulators of the first IQM 102 and second IQM 104 to provide the necessary phase shift of the I and Q components for the second IQM to output the correct frequencies.

The microwave chain has a single reference, an oven controlled crystal oscillator (OCXO) 502. The frequencies in the IQMs are driven by direct digital synthesis (DDS) 506 which takes the frequency reference from frequency synthesisers (FS) 504. The frequencies may be written in the DDS by a controller. To have a clean signal, band-pass filters (BPF) 510 and low-pass filters (LPF) 512 are added. The frequency range needed is large. For example, the frequency range required may be 613 MHz to 1,380 MHz and 25 GHz for the first IQM and from DC to 3 MHz and from 6.57 GHz to 6.83 GHz for the second IQM. Therefore, the microwave chain may use a different path for each frequency and switch between each one with a RF switch 514. This microwave chain is flexible due to the use of the DDS 506 and RF switches 514. The microwave chain 500 has multiple FS, DDS and RF switches to generate the plurality of RF signals to output to the first and second IQMs.

Laser system 100 of FIG. 1 and laser system 400 of FIG. 4 can be used in a wide variety of applications, for example, in quantum sensors and atom interferometry. One application of the laser systems 100 and 400 is in a gravity gradiometer.

Figure 6:
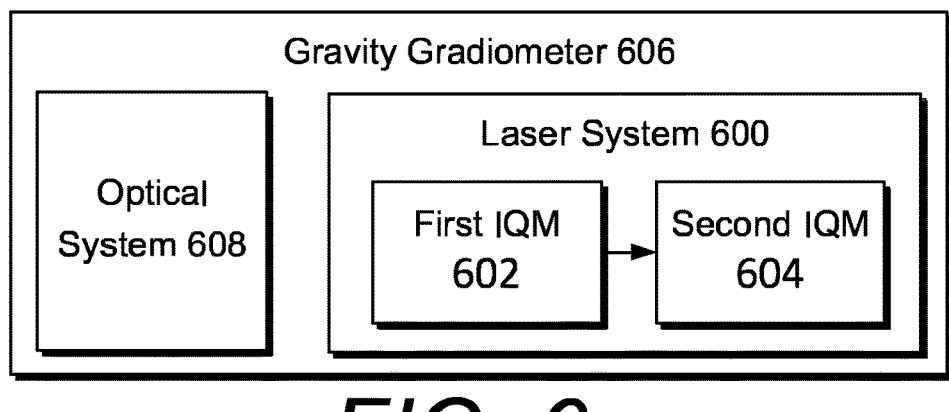
FIG. 6 provides a gravity gradiometer according to an example.
Figure 7:
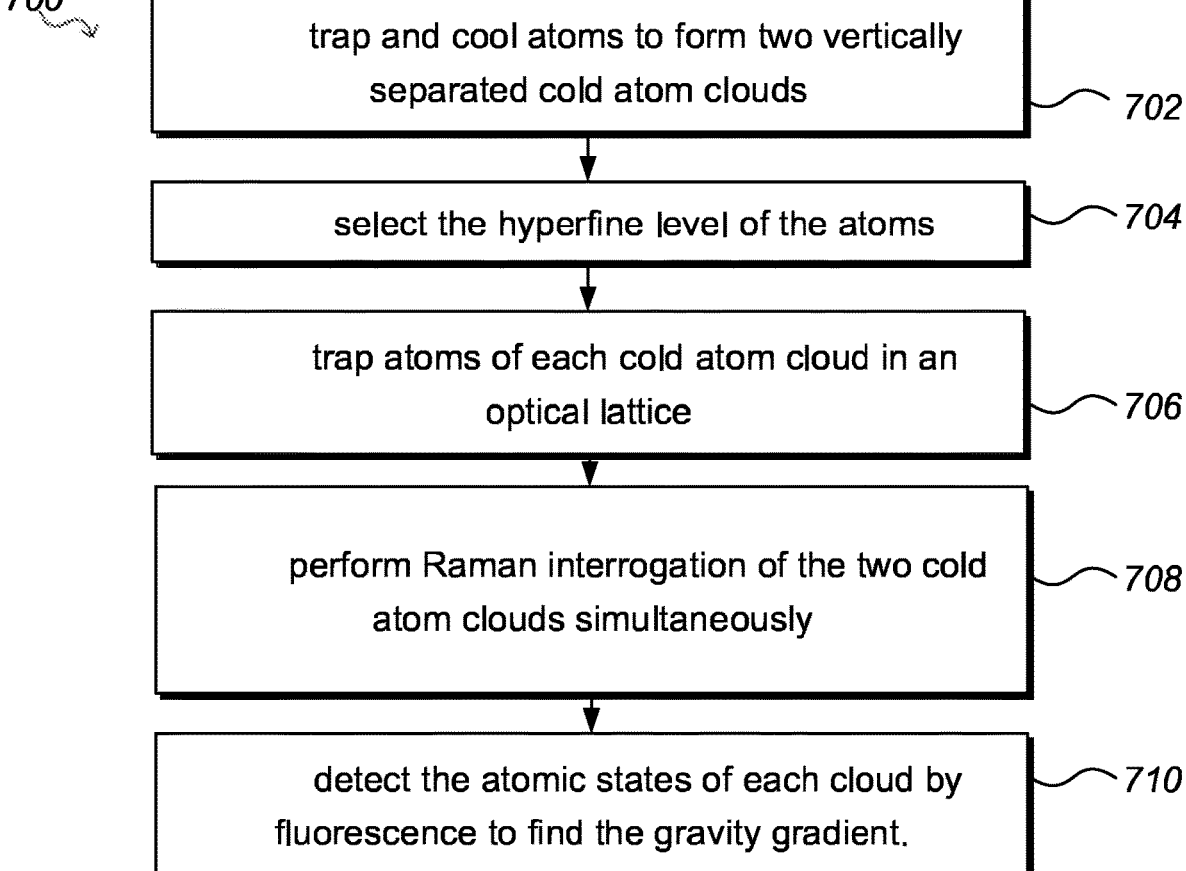
FIG. 7 provides an example flowchart of a method to be performed by a gravity gradiometer according to an example.

FIG. 6 provides a gravity gradiometer 606 according to an example. FIG. 7 provides an example flowchart of a method 700 to be performed by a gravity gradiometer according to an example. The method 700 may be performed by the gravity gradiometer 606 of FIG. 6. Thus, the gravity gradiometer 606 of FIG. 6 will be explained with reference to the method 700 of FIG. 7.

The gravity gradiometer 606 comprises a single arm laser system 600, which comprises a first IQM 602 and a second IQM 604. The single arm laser system 600 may be the laser system 100 of FIG. 1. The first IQM 602 may be the first IQM 102 of the laser system 100 of FIG. 1 and the second IQM 604 may be the second IQM 104 of the laser system 100 of FIG. 1. The single arm laser system 600 may be the laser system 400 of FIG. 4. The laser system 600 may be configured to generate a plurality of optical frequencies. The gravity gradiometer 606 may also comprise an optical system 608 comprising an arrangement of lenses and optics.

The optical system 608 may be configured to, using the optical frequencies generated by the single arm laser system 600, trap and cool 702 atoms at sub-Doppler temperature to form two vertically separated cold atom clouds, select 704 the hyperfine level of the atoms, trap 706 atoms of each cold atom cloud in an optical lattice, perform 708 Raman interrogation of the two cold atom clouds simultaneously with the same laser beam and detect 710 the atomic states of each cloud by fluorescence to find the gravity gradient.

The laser system 600 can generate all the optical frequencies needed for the optical system to perform the method 700 of FIG. 7 using only one laser. This means the optical system can generate optical frequencies for cooling, producing an optical lattice, interrogation and detection using only one laser. The frequencies needed are generated by the two IQMs, the first IQM to shift the frequency and the second IQM to generate a second frequency. The laser beam may then be amplified and the frequency doubled, as described with reference to FIG. 4. The configuration of the two IQMs, meaning the control signals that change the phase modulation of the I and Q components, may change based on whether the laser is being used for cooling, producing an optical lattice, interrogation or detection. Thus all these steps can be realised with a single arm fibre laser bench.

Figure 8A:
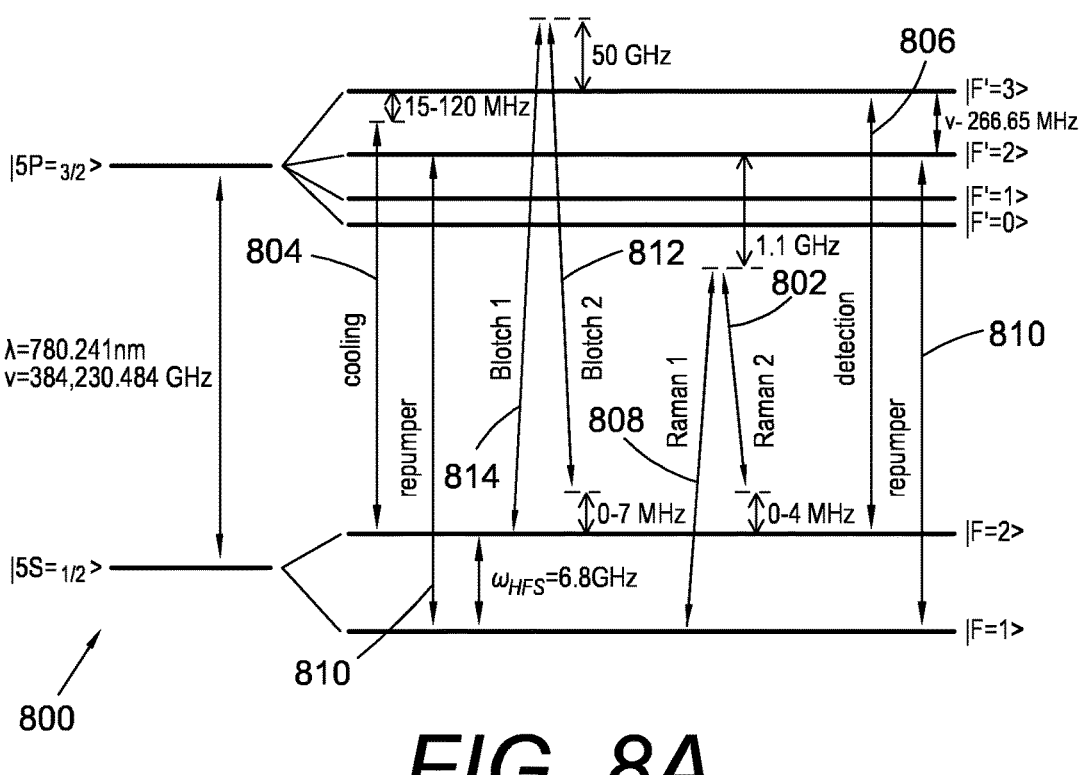
FIG. 8A provides an illustration of the energy levels of an atom of the cloud during an example method to be performed by a gravity gradiometer according to an example.
Figure 8B:
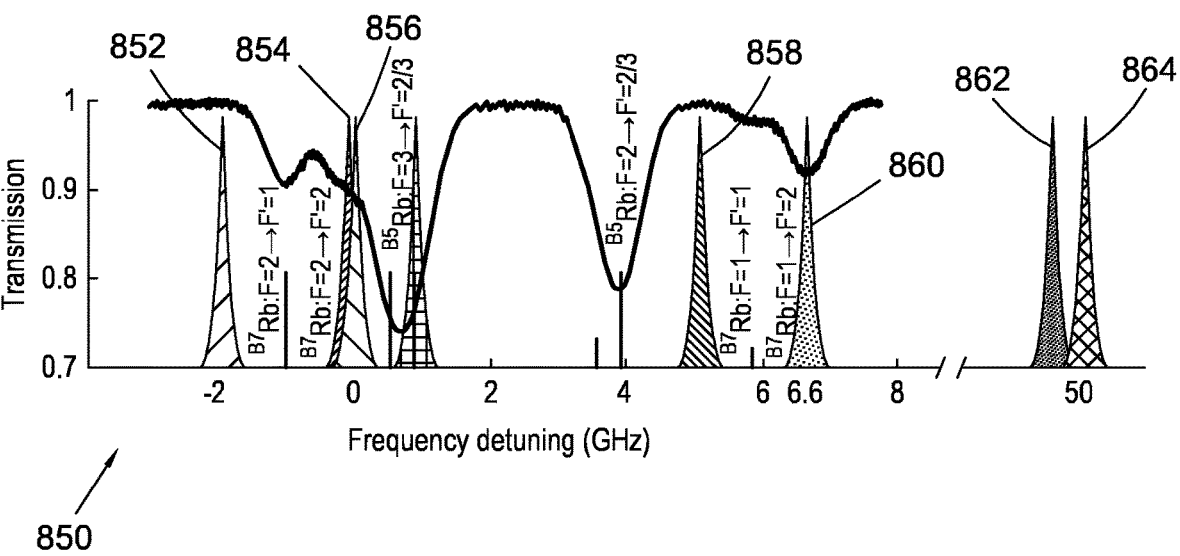
FIG. 8B provides an illustration of the laser frequencies produced by a laser system according to an example during an example method to be performed by a gravity gradiometer according to an example.

FIG. 8A provides an illustration of the energy levels of an atom of the cloud during a method to be performed by a gravity gradiometer according to an example. FIG. 8B provides an illustration of the laser frequencies produced by a laser system according to an example during a method to be performed by a gravity gradiometer according to an example. An example implementation of the method 700 of FIG. 7 will now be explained with reference to FIGS. 8A and 8B, with the atoms to be cooled being Rubidium 87 ($^{87}$Rb)

atoms. However, it is to be understood that the implementation may be adapted to work with other atoms.

The optical system 608 may be configured to, using the optical frequencies generated by the single arm laser system 600, trap and cool 702 atoms to form two vertically separated cold atom clouds. A pyramidal 3D MOT may be used to trap and cool the atoms using Doppler cooling. In a pyramidal 3D MOT design, a single input beam is split by prisms to achieve three counter-propagating beam pairs. The use of a single input beam results in the real and polarization induced intensity noise being both common-mode between beam pairs. This enables highly stable atom cloud temperatures and positions, and enhances the system robustness. A MOT works by thousands of photons in each of the split beams imparting momentum to the atoms in different directions which results in a net loss of momentum which slows (and therefore cools) the atoms down. A magnetic field may be applied such that the atoms have a spatial dependence to enable the atoms to be trapped. Two coils may be used to realise the magnetic quadrupole field for the MOT.

For a $^{87}$Rb atom, the cooling may be generated by addressing the D2 transition $^{87}$Rb|F=2>→|F'=3> with a red shift between 2.5 for the MOT and 20 Γ for the large detuned molasses (Γ=6.065 MHz) and this is generated by a negative shift of 1.08 GHz from the locking point, at the $^{85}$Rb|F=3>→|F'=2/3> crossover transition. This is done using the cooling laser frequency 854 in FIG. 8B that causes the transition 804 in FIG. 8A. The first IQM 602 is used to generate a single sideband and shift the laser frequency by 1.07 GHz for the MOT cooling, as shown in FIG. 8B.

To repump the atoms that fall in the level |F=1> during the cooling stage, a second frequency of 6.58 GHz is added to reach the transition $^{87}$Rb|F=1>→|F'=2>. This is done using the repumper laser frequency 860 in FIG. 8B that causes the transition 810 in FIG. 8A. The second IQM 604 is used to add a sideband and generate another frequency of 6.58 GHz for the repumping, as shown in FIG. 8B.

In an example, after the SHG 410, the frequency shift generated by the first IQM may be doubled, from 621 MHz to 1.08 GHz (by taking in account twice the 80 MHz shift of the AOM) from the locking frequency for the cooling step, while the frequency add by the second IQM remains the same, 6.58 GHz for repumping.

In an example, during the MOT step, the magnetic field gradient is set at 12 G/cm by two coils in anti-Helmholtz configuration. During the molasses a zero magnetic field may be needed so a two-layer magnetic shield can be used for a total attenuation of 66 dB.

The optical system 608 may then be configured to select 704 the hyperfine level of the atoms. Energy levels may be split into hyperfine levels due to the Zeeman effect. Due to the Zeeman effect, a magnetic interaction of the nuclear magnetic moment with the electron magnetic moment causes a frequency shift in the energy levels of the atom. The magnetic interaction is caused by an external magnetic field which splits the degeneracy of the atoms. The hyperfine level of the atoms is needed for the gradiometer to perform Raman interrogation.

The hyperfine level of the atoms may be selected 154 using a narrow microwave transition, and a magnetic field which generate the vertical bias field to split the degeneracy of the atoms. At least one coil may be used to provide the magnetic field for selecting the hyperfine level. To select the level, a microwave pulse may be generated by a microwave antenna and transmitted through the centre of the chamber 308 to interact with the cold atom cloud. This pulse generates a narrow microwave transition between the wanted hyperfine level. After the microwave pulse is generated, the remaining atoms in the other hyperfine level are selectively removed by being "blown away" using a blow away beam pulse.

For the Zeeman sub-level selection, a microwave pulse is generated by the microwave antenna to address the transition between the two hyper fine levels at 6.835 GHz. To split the Zeeman sublevel in the vertical direction bias coils may be used and produce a field of 850 mG.

The optical system 608 may then be configured to, using the optical frequencies generated by the single arm laser system 600, trap 706 atoms of each cold atom cloud in an optical lattice. An optical lattice is formed from two laser beams directed in opposite directions, wherein the laser beams interfere to form the optical lattice. When the two frequencies are the same it generates a standing lattice, when the two frequencies are different it generates a moving lattice with a velocity related to the frequency difference. The optical system may comprise a single laser beam from a single laser, which is then retroreflected on a mirror. The beam and retroreflected beam create an optical lattice. To generate the optical lattice, the frequency of the laser beam is blue shifted from the F'=3 level by about 51 GHz. The frequency needed to generate the optical lattice is the Bloch laser frequency 864 in FIG. 8B that causes the transition 814 in FIG. 8A. There may be a Bloch laser frequency 862 in FIG. 8B that causes the transition 812 in FIG. 8A and this Bloch laser frequency 862 may be different from Bloch laser frequency 864, as illustrated, in order to generate a moving lattice frequency to enable movement of the optical lattice as required.

The first IQM 602 is used to generate a single sideband and shift the laser frequency to 51 GHz for the optical lattice, as shown in FIG. 8B. The second IQM 604 is used to generate a frequency to enable movement of the optical lattice as required. Alternatively, the optical lattice may be a standing wave optical lattice.

The optical system 608 may then be configured to, using the optical frequencies generated by the single arm laser system 600, perform 708 Raman interrogation of the two cold atom clouds simultaneously. This is done using the Raman laser frequencies 852 and 858 in FIG. 8B that cause the transitions 802 and 808 respectively in FIG. 8A. The Raman interrogation uses a two photon transition red shifted by 1 GHz with a frequency difference equal to the hyper fine structure transition (6.8 GHz). This frequency difference is chirped by a few MHz to follow the Earth acceleration. This chirp is swept between each sequence to scan the interferometer phase.

The first IQM 602 is used to generate a single sideband and red shift the laser frequency by approximately 1 GHz of the F'=1 level for the Raman interrogation. The second IQM 604 is used to add a sideband and generate another frequency of 6.8 GHz for the Raman interrogation, as shown in FIG. 8B. The Raman interrogation may be performed by an atom interferometer, for example, a Kasevich-Chu interferometer, which is known in the art and will therefore not be further described.

The optical system 608 may then be configured to, using the optical frequencies generated by the single arm laser system 600, detect 710 the atomic states of each cloud by fluorescence to find the gravity gradient. This may include detecting by fluorescence the ratio between two hyperfine energy levels. This is done using the detection laser frequency 856 in FIG. 8B that causes the transition 806 in FIG. 8A, to detect the atoms in the level F=2, and the repumper laser frequency 860 in FIG. 8B that cause the transition 810 in the FIG. 8A, to repump the atoms in the F=1 level to the level F=2 and then detect them with the detection frequency. To find the interferometer phase the ratio between the level |F=2> and the level |F=1> is detected by fluorescence. These levels are read by using the transition $^{87}$Rb|F=2>→|F'=3> and $^{87}$Rb|F=1>→|F'=2>.

All the transitions needed for the method (except the microwave transition) are generated with a laser beam having a wavelength at 780 nm. The full range of the frequencies is 53 GHz, 110 pm, with a seed frequency fixed. The laser system 600 is configured to generate a laser that has this range of frequencies and that can therefore be used to implement all the necessary laser frequencies for a gravity gradiometer 600. Thus, the gravity gradiometer can be compact due to the laser system 600 being able to produce all required laser frequencies. By making the gravity gradiometer more compact, it can have wider ranging applications.

To implement the laser system 600 to generate the frequencies needed for the gravity gradiometer 600, microwave chain 500 of FIG. 5 may be used. When used in the gravity gradiometer 600, in an example, for the first IQM, the frequency shifts generated by the microwave chain go from 613 MHz for detection to 1.3 GHz for interrogation and 25 GHz for the optical lattice. The first two ranges of frequencies may be generated by the DDS, clocked by a frequency synthesiser that is clocked by the 100 MHz output of the local oscillator (OCXO). The 25 GHz shift may be generated by the DRO.

For the second IQM, the frequencies added may go from 6.568 GHz for repumper during the cooling and detection phase to 6.835 GHz for interrogation and 3 MHz for optical lattice. The first two ranges of frequencies may be generated by mixing the 7 GHz from the OCXO with a DDS signal between 165 to 432 MHz and filtering the output. This DDS is also clocked by the FS that is locked by the 100 MHz of the OCXO. The 3 MHz is obtained by mixing the DDS signal with the 100 MHZ of the OCXO and filtering the output. The antenna is used during the sub-level selection to generate a microwave pulse at 6.835 GHz.

In summary, there is provided a single arm laser system 100 comprising a first in-phase quadrature modulator (IQM) 102, the first IQM 102 configured to receive a single frequency fibred laser beam from a frequency locked laser seed, generate a first single side-band frequency based on a carrier frequency of the single frequency fibred laser beam and suppress the carrier frequency, and output a first fibre laser beam having a single side-band suppressed carrier frequency. The single arm laser system 100 also comprises a second IQM 104 in line with the first IQM 102, the second IQM 104 configured to receive the first fibre laser beam from the first IQM 102, generate a second single side-band frequency based on the first single side-band frequency and maintain the first single side-band frequency as the carrier frequency, and output a second fibre laser beam having the first and second single side band frequencies.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. In particular, any dependent claims may be combined with any of the independent claims and any of the other dependent claims.

The invention claimed is:

1. A single arm laser system comprising:
a first in-phase quadrature modulator (IQM), the first IQM configured to:
receive a single frequency fibred laser beam from a frequency locked laser seed,
generate a first single side-band frequency based on a carrier frequency of the single frequency fibred laser beam and suppress the carrier frequency, and
output a first fibre laser beam having a single side-band suppressed carrier frequency; and
a second IQM in line with the first IQM, the second IQM configured to:
receive the first fibre laser beam from the first IQM,
generate a second single side-band frequency based on the first single side-band frequency and maintain the first single side-band frequency as the carrier frequency, and
output a second fibre laser beam having the first and second single side band frequencies;
the single arm laser system being further configured to change the phase modulation of I and Q components in at least one of the first IQM and the second IQM so that at least one of the first and second single side band frequencies is changed.

2. A single arm laser system according to claim 1, wherein the first IQM receives two radio-frequency (RF) signals of the same frequency in phase quadrature, the generation of the first single side-band frequency being driven by the frequency of the two RF signals input into the first IQM, and wherein the second IQM also receives two RF signals of the same frequency in phase quadrature, the generation of the second single side-band frequency being driven by the frequency of the two RF signals input into the second IQM.

3. A single arm laser system according to claim 2, the single arm laser system further comprising a microwave chain to generate the two RF signals in phase quadrature received by the first IQM, and the two RF signals in phase quadrature received by the second IQM.

4. A single arm laser system according to claim 3, wherein the RF signals generated by the microwave chain are to drive an electro-optic modulator (EOM) which is used to modulate the laser for the spectroscopy locking.

5. A single arm laser system according to claim 3, wherein the microwave chain comprises an oven controlled crystal oscillator (OCXO) as its single frequency reference.

6. A single arm laser system according to claim 1, wherein the single frequency fibred laser beam has a wavelength of about 1560 nm.

7. A single arm laser system according to claim 1, the single arm laser system further comprising an Erbium doped fibre amplifier (EDFA) to amplify the power of the second fibre laser beam.

8. A single arm laser system according to claim 1, the single arm laser system further comprising an acousto-optic modulator (AOM) to switch the second fibre laser beam on and off and to control the power of the second fibre laser beam.

9. A single arm laser system according to claim 1, the single arm laser system further comprising a second harmonic generator (SHG) configured to double the frequencies of the second fibre laser beam, in order to halve the wavelength of the second fibre laser beam from about 1560 nm to about 780 nm.

10. A single arm laser system according to claim 1, the single arm laser system further comprising an optical fibre switch to select an optical delivery of the second fibre laser beam.

11. A gravity gradiometer comprising:
a single arm laser system according to claim 1 configured to generate a plurality of optical frequencies as recited in claim 1; and
an optical system comprising an arrangement of lenses and optics, the optical system configured to, using the optical frequencies generated by the single arm laser system:
trap and cool atoms to form two vertically separated cold atom clouds;
select a hyperfine level of atoms of the cold atom clouds;
trap atoms of each cold atom cloud in an optical lattice;
perform Raman interrogation of the two cold atom clouds simultaneously with the same laser beam; and
detect the atomic states of each cold atom cloud by fluorescence to find a gravity gradient.

12. A method for generating multiple frequencies from a frequency locked laser seed, the method to be performed by at least two in-phase quadrature modulators (IQMs) the method comprising:
receiving a single frequency fibred laser beam from a frequency locked laser seed;
shifting a frequency of the laser seed from a locking frequency;
generating a generated frequency based on the shifted frequency; and
outputting a laser beam through a selected optical delivery having the shifted frequency and the generated frequency;
the method further comprising changing the phase modulation of I and Q components in at least one of the two IQMs so that at least one of the shifted frequency and the generated frequency is changed.

13. The method of claim 12, the method further comprising:
amplifying a laser power;
controlling the laser power; and
doubling laser frequencies.

* * * * *